United States Patent
Astrike

(10) Patent No.: US 9,656,615 B2
(45) Date of Patent: May 23, 2017

(54) PUSH-UP LEDGE FOR TRIM PANEL

(71) Applicant: Toyota Motor Engineering & Manufacturing North America, Inc., Erlanger, KY (US)

(72) Inventor: Logan R. Astrike, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/833,699

(22) Filed: Aug. 24, 2015

(65) Prior Publication Data

US 2017/0057426 A1    Mar. 2, 2017

(51) Int. Cl.
*B60R 13/02* (2006.01)
*B62D 25/04* (2006.01)

(52) U.S. Cl.
CPC ............ *B60R 13/025* (2013.01); *B62D 25/04* (2013.01)

(58) Field of Classification Search
CPC ... B60R 13/025; B60R 13/0206; B60R 13/02; B62D 25/04
USPC .................................................... 296/193.06
See application file for complete search history.

(56) References Cited

U.S. PATENT DOCUMENTS

| 5,072,848 | A | 12/1991 | Pipis et al. | |
|---|---|---|---|---|
| 7,445,233 | B2 * | 11/2008 | McKimson | B60R 13/025 280/728.2 |
| 7,963,551 | B2 * | 6/2011 | Matsuoka | B60R 13/025 280/730.2 |
| 2012/0104784 | A1 | 5/2012 | Sapak et al. | |

* cited by examiner

*Primary Examiner* — Pinel Romain
(74) *Attorney, Agent, or Firm* — Dinsmore & Shohl LLP

(57) ABSTRACT

A trim panel assembly for a vehicle is provided having a pillar and a trim panel adapted to attach to at least a portion of the pillar. The trim panel having an upper edge and a lower edge. At least one ledge extending generally orthogonally away from the lower edge of the trim panel. The assembly further includes a headliner, the upper edge of the trim panel abutting the headliner to compress the headliner when the trim panel is in an installed position. The trim panel is adapted to closely abut a headliner wherein the ledge provides the installer to apply a greater force to the trim panel during installation to provide for a greater headliner crush. In order to finish installing the trim panel, the installer must push upwards on the ledges thereby creating greater interference with the headliner to properly secure the trim panel.

20 Claims, 2 Drawing Sheets

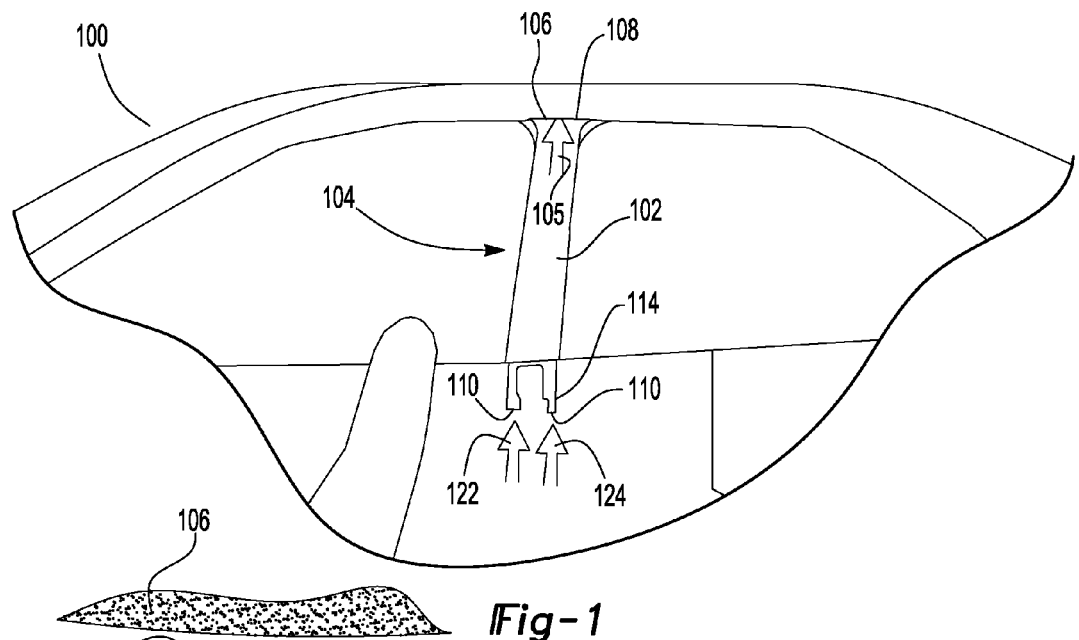
*Fig-1*
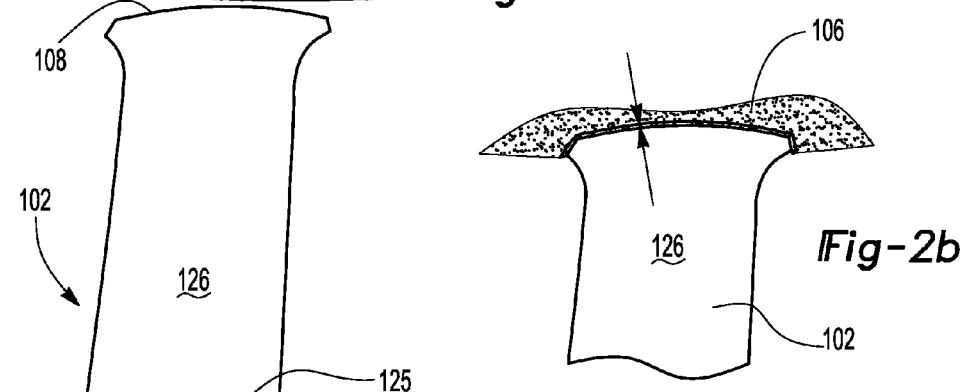
*Fig-2b*
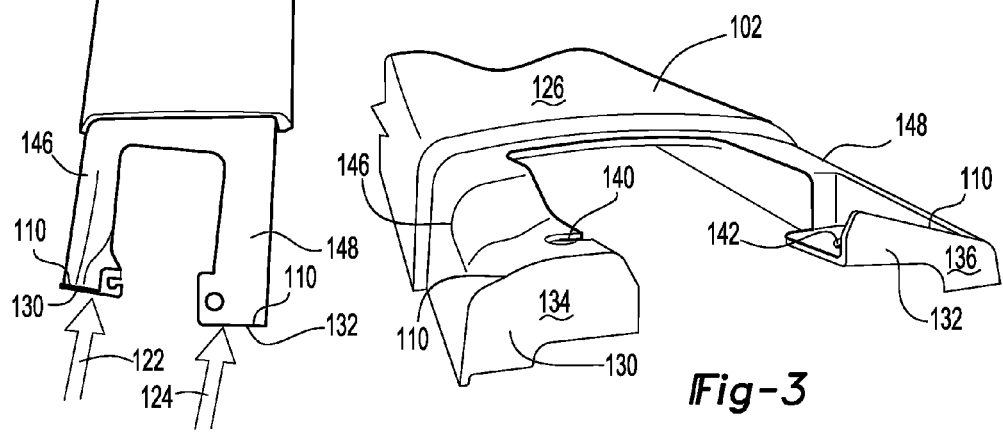
*Fig-2a*
*Fig-3*

PUSH-UP LEDGE FOR TRIM PANEL

FIELD OF THE INVENTION

The present invention relates generally to a trim panel. More particularly, the present invention relates to a trim panel having a dedicated ledge to assist in installation force.

BACKGROUND OF THE INVENTION

Trim panels are frequently used within the vehicle to provide an aesthetically appealing appearance to the inside of the vehicle. These trim panels typically have space constraints and demands to fit the trim panels within specific locations of the vehicle. However, as space constraints become more demanding, it becomes increasingly difficult to the installer to properly, securely, and tightly install the trim panel within the vehicle. Accordingly, there exists a need in the art to provide a trim panel having a dedicated feature to assist in the installation of a trim panel within the vehicle.

SUMMARY OF THE INVENTION

A trim panel assembly for a vehicle is provided having a pillar and a trim panel adapted to attach to at least a portion of the pillar. The trim panel having an upper edge and a lower edge. At least one ledge extending generally orthogonally away from the lower edge of the trim panel. The assembly further includes a headliner, the upper edge of the trim panel abutting the headliner to compress the headliner when the trim panel is in an installed position. The trim panel is adapted to closely abut a headliner wherein the ledge provides the installer to apply a greater force to the trim panel during installation to provide for a greater headliner crush. In order to finish installing the trim panel, the installer must push upwards on the ledges thereby creating greater interference with the headliner to properly secure the trim panel. Once the trim panel is closely abutting the headliner, fasteners are used to secure the trim panel to the B-pillar through the apertures. As such, the ledge provides for increased ergonomics during installation for the installer.

The trim panel is adapted to cover at least a portion of the pillar. In one embodiment, two total ledges are provided extending generally orthogonally away from the lower edge of the trim panel, the ledges adapted to assist an installer of the trim panel. The at least one ledge has a predetermined length, the predetermined length being long enough to accommodate at least three fingers of the installer during installation where the predetermined length of the at least one ledge is between 35-60 millimeters. Further, the at least one ledge has a predetermined width, the predetermined width being wide enough to accommodate the fingers of the installer during installation. In this embodiment, the predetermined width of the at least one ledge is between 8-35 millimeters. The at least one ledge includes a planar surface, the planar surface and a front surface of the trim panel forming a right angle. Further, the trim panel is elongated and the at least one ledge and the trim panel are integrally formed.

In most embodiments, the trim panel includes at least one aperture adapted to permit connection to the pillar. After the user pushes up on the ledges to align the apertures (and to crush the headliner), a fastener may be positioned through the aperture to connect the trim panel to the pillar.

In another embodiments, a first position defined where the upper edge of the trim panel is spaced apart from the headliner before final installation. A second positioned defined where the upper edge of the headliner abuts the headliner to compress the headliner after installation.

BRIEF DESCRIPTION OF THE DRAWINGS

FIG. 1 illustrates an environmental view of the trim piece installed within the vehicle;

FIG. 2A illustrates a front view of the trim piece during installation;

FIG. 2B illustrates the upper portion of the trim piece abutting the headliner in an installed position;

FIG. 3 illustrates a perspective bottom view illustrating the ledges of the present invention.

DETAILED DESCRIPTION OF THE INVENTION

Figure 4:
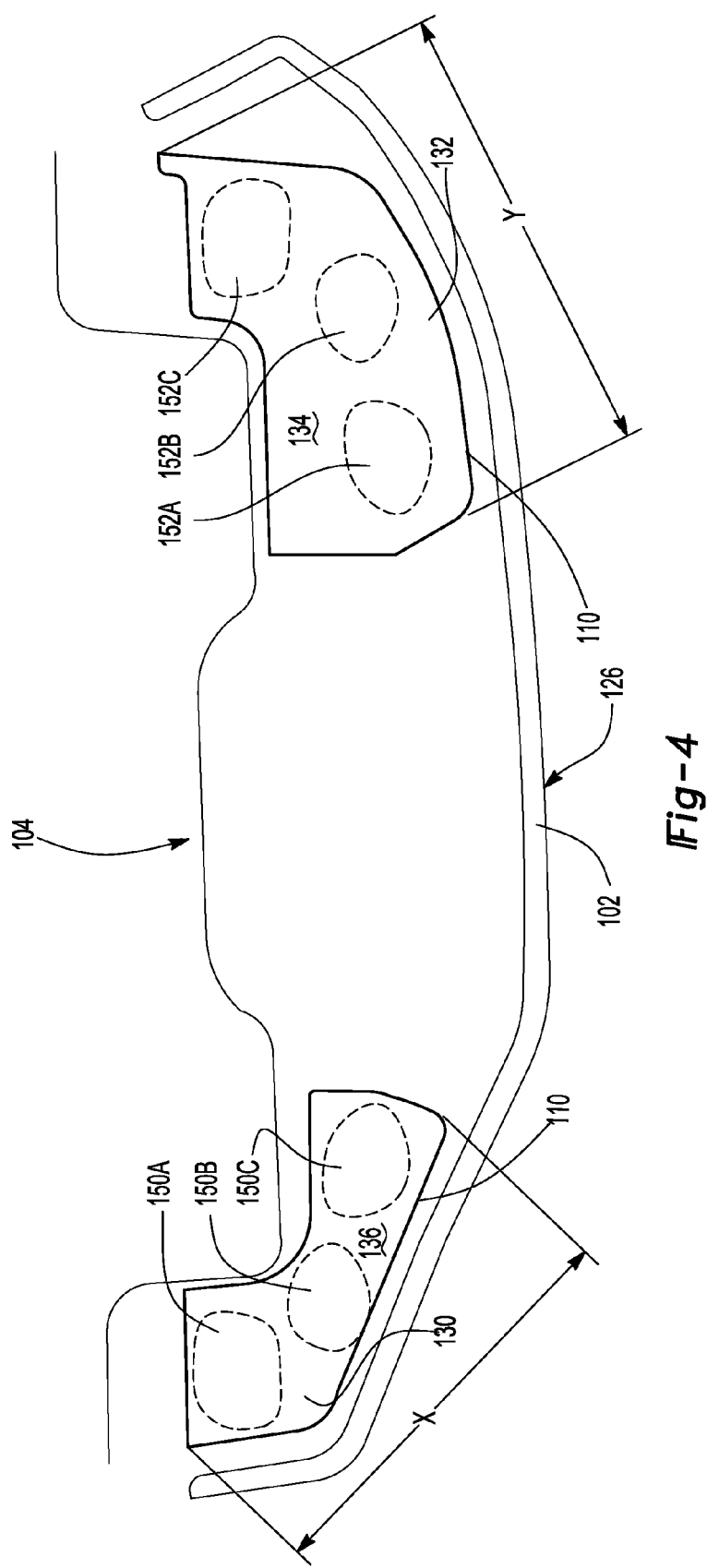
FIG. 4 illustrates a bottom view of the trim panel having the ledges.

A trim panel having a ledge configured to allow an installer to ergonomically install a trim panel over a pillar, and adjacent to a headliner, within a vehicle. The trim panel includes at least one ledge extending away from a lower edge of the panel. The trim panel is adapted to closely abut a headliner wherein the ledge provides the installer to apply a greater force to the trim panel during installation to provide for a greater headliner crush. In order to finish installing the trim panel, the installer must push upwards on the ledges thereby creating greater interference with the headliner to properly secure the trim panel. Once the trim panel is closely abutting the headliner, fasteners are used to secure the trim panel to the B-pillar through the apertures. As such, the ledge provides for increased ergonomics during installation for the installer.

The vehicle 100 includes the installed trim panel 102 on the B-pillar 104. When sufficiently installed, an upper edge 108 of the trim panel 102 closely abuts the headliner 106 of the vehicle 100. As shown by directional arrows 122, 124, a force by a user is put on the lower ledges of the trim panel 102 in an upward direction 105 to install the trim panel 102.

The trim panel 102 includes an outer surface 126, as viewed by the interior of the vehicle 100. The trim panel 102 includes extended portions 146, 148 integrally connected with the main portion 125 of the trim panel 102. The extended portions 146, 148 include a pair of ledges 130, 132. The ledges are located on the lower edge 110 of the trim panel 102. The upper edge 108 is adapted to abut the headliner 106.

The trim panel 102 further includes apertures 140, 142 allowing a fastener to secure the trim panel 102 to the B-pillar 104. In most embodiments, the trim panel 102 includes at least one aperture 140, 142 adapted to permit connection to the B-pillar 104. After the user pushes up on the ledges 130, 132 to align the apertures 140, 142 (and to crush the headliner 106), a fastener may be positioned through the at least one aperture 140, 142 to connect the trim panel 102 to the B-pillar 104.

During installation, an installer must grip the ledges 130, 132 and push or pull upwards in the direction of arrows 122, 124 to properly install the trim panel 102. The trim panel 102 is an interior trim panel. During installation, the installer will wrap either arm around the B-pillar 104 so each hand is on an opposite side of the B-pillar during installation. The installer's hands pull upwards on each of the ledges 130, 132. In order to finish installing the trim panel 102, the installer must push upwards on the ledges 130, 132 thereby creating greater interference with the headliner 106 (at the opposite edge of the trim panel) to properly secure the trim panel 102. Once the trim panel is closely abutting the headliner 106, fasteners are used to secure the trim panel 102 to the B-pillar 104 through the apertures 140, 142.

In another embodiments, a first position defined where the upper edge of the trim panel is spaced apart from the headliner before final installation. A second positioned defined where the upper edge of the headliner abuts the headliner to compress the headliner after installation.

Bolts, fasteners, clips may be used to secure the trim panel 102 to the B-pillar 104. Without the inclusion of the ledges 130, 132, the trim panel 102 may be 10 millimeters or more below the apertures on the B-pillar since the installer does not have enough force to push the trim panel 102 to the correct installed position by crushing a portion of the headliner. Accordingly, the present system allows for improved installer ergonomics and ease of installation.

The ledges 130, 132, as illustrated in FIG. 4, have predetermined lengths x, y. The predetermined lengths must be sufficiently long enough to allow an installer to position at least three fingers on the lower surfaces 134, 136 of the respective ledges 130, 132. In the present embodiment, the ledges have a predetermined length x, y of between 35-60 millimeters. Further, the at least one ledge has a predetermined width, the predetermined width being wide enough to accommodate the fingers of the installer during installation. In this embodiment, the predetermined width of the at least one ledge is between 8-35 millimeters. The at least one ledge includes a planar surface, the planar surface and a front surface of the trim panel forming a right angle. Further, the trim panel is elongated and the at least one ledge and the trim panel are integrally formed.

FIG. 4 illustrates the trim panel 102 connected to the B-pillar 104. The circles 150a, 150b, 150c of the ledge 130 on the lower surface 134, as shown in phantom, represent the theoretical finger placings of the installer during use. It is shown that using at least three fingers per ledge greatly improves the force able to be used during installation. Similarly, the ledge 132 has finger placement positions also shown in phantom at 152a, 152b, 152c. The ledges 130, 132 extend generally orthogonally away from the lower edge 110 of the trim panel 102.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

The invention claimed is:

1. A trim panel assembly for a vehicle, the trim panel assembly comprising:
    a pillar;
    a headliner;
    a trim panel adapted to attached to at least a portion of the pillar, the trim panel having an upper edge and a lower edge; and
    at least one ledge extending generally orthogonally away from the lower edge of the trim panel, the at least one ledge and the trim panel being integrally formed;
    wherein the upper edge of the trim panel abutting the headliner to compress the headliner when the trim panel is in an installed position.

2. The trim panel assembly of claim 1 wherein the trim panel is adapted to cover at least a portion of the pillar, and wherein the trim panel is elongated.

3. The trim panel assembly of claim 1 wherein two total ledges are provided extending generally orthogonally away from the lower edge of the trim panel, the ledges adapted to assist an installer of the trim panel.

4. The trim panel assembly of claim 1 wherein the at least one ledge has a predetermined length, the predetermined length being long enough to accommodate at least three fingers of the installer during installation.

5. The trim panel assembly of claim 4 wherein the predetermined length of the at least one ledge is between 35-60 millimeters.

6. The trim panel assembly of claim 1 wherein the at least one ledge has a predetermined width, the predetermined width being wide enough to accommodate the fingers of the installer during installation.

7. The trim panel assembly of claim 6 wherein the predetermined width of the at least one ledge is between 8-35 millimeters.

8. The trim panel assembly of claim 1 wherein the trim panel includes at least one aperture adapted to permit connection to the pillar.

9. The trim panel assembly of claim 1 wherein the at least one ledge includes a planar surface, the planar surface and a front surface of the trim panel forming a right angle.

10. A trim panel assembly for a vehicle, the assembly comprising:
    a pillar;
    a headliner;
    a trim panel adapted to attached to at least a portion of the pillar, the trim panel having an upper edge and a lower edge; and
    at least one ledge extending generally orthogonally away from the lower edge of the trim panel, the at least one ledge and the trim panel being integrally formed;
    wherein the upper edge of the trim panel is spaced apart from the headliner in a first position before final installation and the upper edge of the trim panel abuts the headliner to compress the headliner in a second position after installation.

11. The trim panel assembly of claim 10 wherein the trim panel is adapted to cover at least a portion of the pillar, and wherein the trim panel is elongated.

12. The trim panel assembly of claim 10 wherein two total ledges are provided extending generally orthogonally away from the lower edge of the trim panel, the ledges adapted to assist an installer of the trim panel.

13. The trim panel assembly of claim 10 wherein the at least one ledge has a predetermined length, the predetermined length being long enough to accommodate at least three fingers of the installer during installation.

14. The trim panel assembly of claim 13 wherein the predetermined length of the at least one ledge is between 35-60 millimeters.

15. The trim panel assembly of claim 10 wherein the at least one ledge has a predetermined width, the predetermined width being wide enough to accommodate the fingers of the installer during installation.

16. The trim panel assembly of claim 15 wherein the predetermined width of the at least one ledge is between 8-35 millimeters.

17. The trim panel assembly of claim 10 wherein the at least one ledge includes a planar surface, the planar surface and a front surface of the trim panel forming a right angle.

18. A trim panel assembly for a vehicle, the trim panel assembly comprising:
- a pillar;
- a headliner;
- a trim panel adapted to attached to at least a portion of the pillar, the trim panel having an upper edge and a pair of spaced apart extended portions, each of the pair of spaced apart extended portions having a lower edge; and
- at least one ledge extending generally orthogonally away from each of the lower edges of the pair of spaced apart extended portions;
- wherein the upper edge of the trim panel abuts the headliner to compress the headliner when the trim panel is in an installed position.

19. The trim panel assembly of claim 18 wherein the at least one ledge of each of the lower edges of the pair of spaced apart extended portions includes a planar surface, the planar surface and a front surface of the trim panel forming a right angle.

20. The trim panel assembly of claim 18 wherein the pair of spaced apart extended portions and the trim panel are integrally formed.

* * * * *